United States Patent [19]
Bleich et al.

[11] Patent Number: 5,151,294
[45] Date of Patent: Sep. 29, 1992

[54] METHOD FOR FORMING A PROTECTIVE FILM ON A SLIDER AIR BEARING SURFACE IN A MAGNETIC RECORDING DISK FILE

[75] Inventors: Herman E. Bleich, Morgan Hill; Luis P. Franco, Gilroy; Ian L. Sanders, Morgan Hill, all of Calif.

[73] Assignee: International Business Machines Corporation, Armonk, N.Y.

[21] Appl. No.: 795,283

[22] Filed: Nov. 19, 1991

Related U.S. Application Data

[63] Continuation of Ser. No. 616,719, Nov. 16, 1990, abandoned, which is a continuation-in-part of Ser. No. 416,758, Oct. 3, 1989, abandoned.

[51] Int. Cl.$^5$ .............................................. B05D 5/12
[52] U.S. Cl. ..................................... 427/11; 427/131; 427/132
[58] Field of Search .................. 427/131, 132, 11; 428/695, 900, 64

[56] References Cited

U.S. PATENT DOCUMENTS 4,692,832  9/1987  Bandara et al. ..................... 360/137

FOREIGN PATENT DOCUMENTS 3714787  11/1988  Fed. Rep. of Germany .
6271011   4/1987  Japan .
63-251981 10/1988  Japan .

OTHER PUBLICATIONS

J. C. Scott, PCT Application-No. 8806334.

Primary Examiner—Bernard Pianalto
Attorney, Agent, or Firm—Thomas R. Berthold

[57] ABSTRACT

A method is described for depositing a thin protective carbon film on the air bearing surface of a slider in a magnetic recording disk file. A disk file with a conventional slider and a disk with an essentially carbon protective overcoat is cycled on and off at a frequency such that the slider is maintained in contact with the disk. Alternatively, the disk is rotated at a low constant speed so that the slider is maintained in contact with the disk. In both cases, carbon is transferred from the carbon overcoated disk to the air bearing surface of the slider such that during subsequent operation of the disk file, the disk file has excellent durability, especially when operated at relatively low humidity, as is required in those disk files which use a magnetoresistive sensor on the slider.

7 Claims, 1 Drawing Sheet

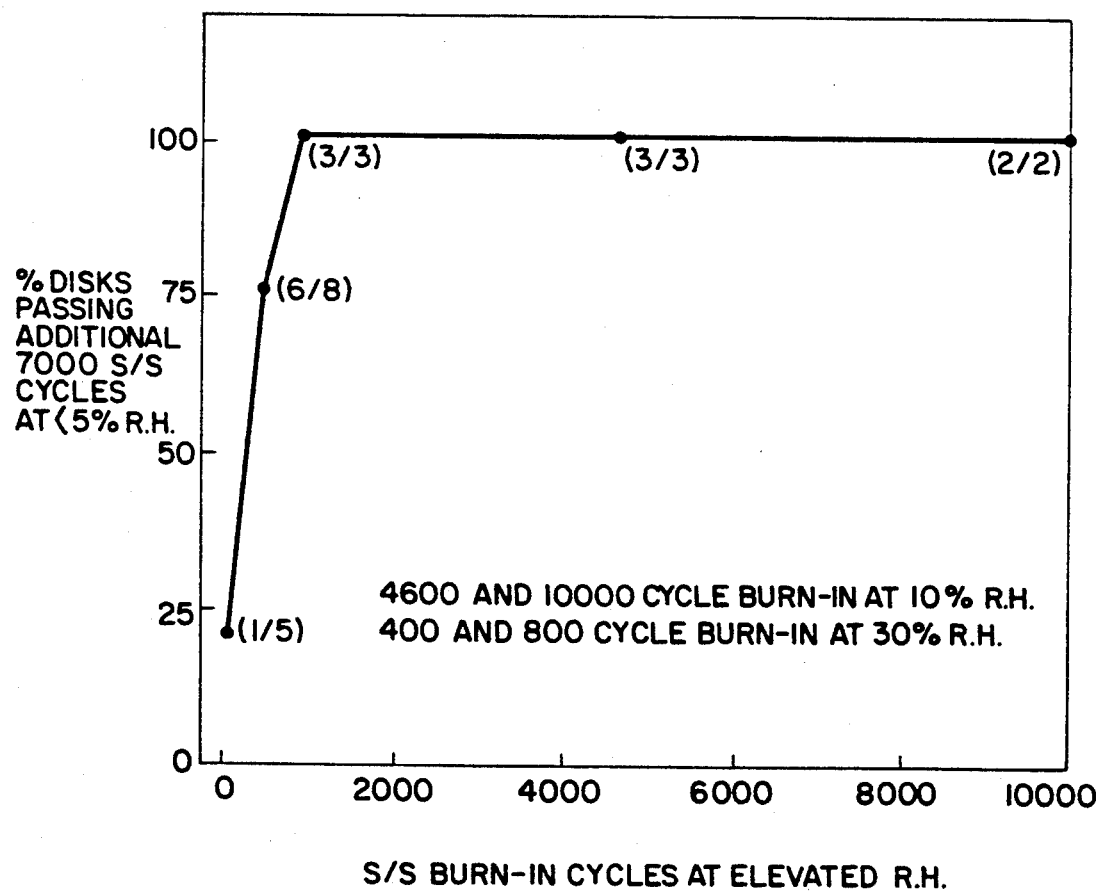

5,151,294

METHOD FOR FORMING A PROTECTIVE FILM ON A SLIDER AIR BEARING SURFACE IN A MAGNETIC RECORDING DISK FILE

This application is a continuation of Ser. No. 07/616,719, filed Nov. 16, 1990 which is a continuation-in-part of Ser. No. 07/416,758, filed Oct. 3, 1989, both now abandoned.

TECHNICAL FIELD

This invention relates to magnetic recording disk files of the type which utilize disks with protective carbon overcoats and read or write heads supported on air bearing sliders. In particular, the invention relates to a method for forming a relatively thin protective carbon film on the air bearing surface of a slider to thereby improve the durability of the head-disk interface in the disk file.

BACKGROUND OF THE INVENTION

In conventional rotating disk files, the read/write transducers (or heads) are supported on sliders which ride on cushions or bearings of air above the disk surface when the disks are rotating at operating speed. The slider is connected to a linear or rotary voice coil actuator by means of a relatively fragile suspension. In large capacity magnetic recording disk files, there is generally a stack of rigid disks and a number of actuators with each actuator supporting a number of sliders. The actuators move the sliders generally radially between the disks so that each head may access the recording area of a respective disk. In these conventional disk files, the slider is biased against the disk surface by a small force from the suspension when the disk is not rotating. The slider is thus in contact with the disk surface from the time the disk file is turned on until the disk reaches a speed sufficient to cause the slider to ride on the air bearing. The slider is again in contact with the disk surface when the disk file is turned off and the rotational speed of the disk falls below that necessary to create the air bearing.

One type of magnetic recording disk used in disk files is a thin film metal alloy or metal oxide disk which has a protective overcoat of essentially carbon. The carbon overcoat protects the magnetic layer of the disk from corrosion as well as wear caused by contact by the air bearing surface of the slider supporting the read/write head. A liquid lubricant such as a perfluoroether, is typically applied to the carbon overcoat.

Protective carbon overcoats for thin film metal alloy disks are well known. They are typically formed by sputter deposition from a graphite target, and are generally referred to merely as protective carbon overcoats, sputtered carbon overcoats, "diamondlike" carbon overcoats, amorphous carbon overcoats, or, in the case of those overcoats formed by sputter deposition in the presence of a hydrogen containing gas, hydrogenated carbon overcoats. Tsai, et al in "Structure and Properties of Sputtered Carbon Overcoats on Rigid Magnetic Media Disks," *J. Vac Science Technology* A6(4), July/August 1988, pp. 2307–2314, describe such protective carbon overcoats and refer to them as amorphous "diamondlike" carbon films, the "diamondlike" referring to their hardness rather than their crystalline structure. Assignee' U.S. Pat. No. 4,778,582, issued Oct. 18, 1988, describes the prior art of thin film disk amorphous hydrogenated carbon overcoats and a sputter deposition process for forming such an overcoat.

Recent advances in read/write head technology have resulted in the possible use of magnetoresistive (MR) read heads in disk files. Unlike conventional inductive heads, MR heads, due to the material from which they are fabricated, are highly susceptible to corrosion. Accordingly, in order to assure proper operation of such heads in disk files, including those which use carbon overcoated disks, it is necessary to operate the disk file at very low humidity. However, it has been discovered that when disk files with carbon overcoated disks are operated at low humidity in conjunction with TiC/Al$_2$O$_3$ sliders, the disks wear at an extremely high rate.

SUMMARY OF THE INVENTION

The present invention is a method for transferring carbon from the carbon overcoated disk to the air bearing surface of a slider. In the preferred method, the assembled disk file is maintained in an environment having a relative humidity (RH) of greater than approximately 30%. The disk file is then cycled on and off at a frequency sufficient to maintain the slider in contact with the carbon overcoated disk. As a result of these start/stop (s/s) cycles, carbon is transferred from the carbon overcoated disk to the air bearing surface of the slider to a thickness less than approximately 50 Å. After the carbon film has been deposited on the air bearing surface of the slider in this manner, the disk file can then be maintained at relatively low humidity and operated without any loss in durability of the disk. This permits MR heads to be used in disk files without any loss in disk durability.

For a fuller understanding of the nature and advantages of the present invention, reference should be made to the following detailed description taken in conjunction with the accompanying drawing.

BRIEF DESCRIPTION OF THE DRAWINGS

FIG. 1 is a plot representing disk durability as a function of the number of "burn in" start/stop cycles.

DESCRIPTION OF THE PREFERRED EMBODIMENT

The durability of disks in magnetic recording disk files is determined by measuring the number of start/stop cycles before failure of the head-disk interface. It has been found that when carbon overcoated thin film disks are used with conventional sliders (e.g., a composite TiC/Al$_2$O$_3$ ceramic), the disk durability is directly related to the relative humidity to which the head-disk interface is exposed. As the relative humidity decreases below approximately 30%, the disk durability decreases generally linearly. During the determination of the relationship between disk durability and humidity, it was discovered that frequent start/stop cycling of sliders on carbon overcoated disks resulted in a deposition of a carbon film on the air bearing surfaces of the sliders. Subsequent testing of these disk files showed a significantly improved disk durability when operated at low humidity (i.e., less than approximately 30% RH). Thus a method for improving the disk durability of disk files involves transferring carbon from the carbon overcoated disk to the air bearing surface of the slider by rotating the disk at a velocity sufficient to maintain the slider in contact with the disk surface.

In the preferred embodiment for carrying out the present invention, the assembled disk file is connected to a commercially available disk exerciser and the disk file is cycled on and off at a frequency such that the sliders are maintained in contact with the carbon overcoated disks. The improved durability of such disk files is illustrated in FIG. 1, which represents the relationship between the percentage of disks which pass an additional 7000 s/s cycles as a function of the number of s/s "burn in" cycles. In these disk files liquid perfluoroether lubricant was applied to the carbon overcoated disks. Referring to FIG. 1, when five disk files were not subjected to s/s burn in cycles, four of the five disk files failed to survive an additional 7000 s/s cycles at less than 5% RH. On the other hand, when eight disk files were subjected to 400 s/s cycles at approximately 30% RH, only two of these eight failed to survive an additional 7000 s/s cycles at less than 5% RH. As shown by FIG. 1, the transfer of the carbon overcoat to the air bearing surface of the slider can be accomplished at various s/s cycles and various relative humidities. For example, when the disk files were subjected to 4600 s/s cycles at only 10% RH, all three of these disk files survived an additional 7000 s/s cycles at very low humidity, i.e. less than 5% RH.

While the preferred embodiment for forming the carbon overcoat on the slider air bearing surface is by cycling the disk file through a series of s/s cycles such that the slider is maintained in contact with the carbon overcoated disk, it is also possible to deposit the carbon film onto the slider by running the disk file at a relatively constant slow speed such that the slider is maintained in essentially continual contact with the carbon overcoated disk. It is also preferable to perform this burn in in a nondata band or region of the disk, such as a slider "landing zone" located either at the inside or outside diameter of the disk. Other nondata regions are bands at the extreme outside diameter (OD) and extreme inside diameter (ID) of the disk, which are regions beyond the landing zone which are not accessible by the slider during normal operation of the disk file. Thus, the disk drive exerciser bypasses the normal drive electronics and commands the actuator to move to these OD or ID bands prior to the burn in. In this manner, the data regions of the disk are not exposed to any excessive wear which may be caused by the burn in. In addition, while it is possible to transfer carbon to the air bearing surface of the slider to a thickness greater than 50 Å, a carbon film of excessive thickness on the slider results in a spacing loss between the read/write head on the slider and the data on the disk. A 50 Å carbon film on the slider is sufficient to prevent damage to the disk and provides protection to the MR head if the disk file is maintained at relatively low humidity (i.e., less than approximately 30% RH). It has been found experimentally that if a TiC/Al$_2$O$_3$ slider is subjected to 1,000 s/s cycles on a thin film disk with a 300 Å overcoat comprising 80–90 at. % carbon and 10–20 at. % hydrogen, an essentially uniform film of ~50 Å of carbon is formed on the air bearing surface of the slider. The protective carbon overcoat on the disk in this experiment was an amorphous hydrogenated carbon overcoat formed by the sputter deposition of carbon from a graphite target in an Ar-4% H$_2$ gas, in a manner similar to that described in the previously cited '582 patent. Thus, the carbon film formed on the slider was also an essentially amorphous hydrogenated carbon film. The method of the present invention is fully applicable to those thin film disks which have protective carbon overcoats containing little or no hydrogen, such as the carbon overcoats formed by sputtering in the presence of pure Ar. If such disks were used, then the carbon film formed on the slider would also be an essentially amorphous carbon film having no substantial amount of hydrogen.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for depositing a film of essentially amorphous carbon on the air bearing surface of a slider in a magnetic recording disk file, the disk file being of the type wherein the disk associated with said slider has a thin film metal alloy or metal oxide magnetic layer and an essentially amorphous carbon protective overcoat, the method comprising the steps of causing the slider to move to a nondata region on the disk not accessible by the slider during normal operation of the disk file, and maintaining the disk at a rotational speed less than the speed required to cause the slider to ride on the air bearing by repetitively starting and stopping rotation of the disk while maintaining the air bearing surface of the slider in continuous contact with the carbon overcoat of the disk for a period of time sufficient to transfer carbon from the disk overcoat to the slider air bearing surface.

2. The method according to claim 1 wherein the carbon overcoat is a hydrogenated carbon overcoat.

3. The method according to claim 1 wherein the step of repetitively starting and stopping rotation of the disk comprises performing between approximately 400 to 1000 start/stop cycles while minimizing the time between cycles so as to prevent temperature fluctuations of the slider air bearing surface.

4. The method according to claim 1, wherein the carbon overcoat is a hydrogenated carbon overcoat.

5. The method according to claim 1 further comprising the step of maintaining the slider and disk in an environment of greater than approximately 30 percent relative humidity while rotating the disk.

6. A method for depositing a film of essentially amorphous carbon on the air bearing surface of a slider in a magnetic recording disk file, the disk file being of the type wherein the disk associated with said slider has a thin film metal alloy or metal oxide magnetic layer and an essentially amorphous carbon protective overcoat and wherein said slider supports a magnetoresistive sensor, the method comprising the steps of maintaining the relative humidity in the disk file at greater than approximately 30 percent, causing the slider to move to a nondata region on the disk not accessible by the slider during normal operation of the disk file, and rotating the disk at an essentially constant speed less than the speed required to cause the slider to ride on the air bearing so as to maintain the air bearing surface of the slider in continuous contact with the carbon overcoat of the disk for a period of time sufficient to transfer carbon from the disk overcoat to the slider air bearing surface to a thickness less than approximately 50 Angstroms.

7. A method for depositing a film of essentially amorphous carbon on the air bearing surface of a slider in a magnetic recording disk file, the disk file being of the type wherein the disk associated with said slider has a thin film metal alloy or metal oxide magnetic layer and an essentially amorphous carbon protective overcoat, the method comprising the steps of causing the slider to move to a nondata region on the disk not accessible by the slider during normal operation of the disk file, and rotating the disk at a speed less than the speed required to cause the slider to ride on the air bearing so as to maintain the air bearing surface of the slider in continuous contact with the carbon overcoat of the disk for a period of time sufficient to transfer carbon from the disk overcoat to the slider air bearing surface.

* * * * *